Jan. 15, 1946.   P. E. PERMAN   2,393,120
SAFETY DEVICE IN SCREW HOISTING BLOCKS
Filed Nov. 27, 1943   2 Sheets-Sheet 2

APPLICANT.
PER EMIL PERMAN.
by Haseltine, Lake & Co
ATTORNEYS.

Patented Jan. 15, 1946

2,393,120

UNITED STATES PATENT OFFICE 2,393,120

SAFETY DEVICE IN SCREW HOISTING BLOCKS

Per Emil Perman, Stockholm, Sweden

Application November 27, 1943, Serial No. 511,944
In Sweden May 27, 1943

5 Claims. (Cl. 254—170)

The present invention relates to load hoisting blocks and more specifically to that type of hoisting blocks in which a worm drive is arranged between hand chain wheel and load chain wheel.

It is a primary object of this invention to enhance the safety of such hoisting blocks and to render impossible any use of the block when the load exceeds a certain predeterminable admissible amount.

To accomplish this object, the load hoisting block, in accordance with the invention, is provided with a worm shaft displaceable in axial direction, against the action of a spring under the thrust on the worm shaft caused by the load and transmitted through the worm wheel shaft, the worm wheel and the worm.

More specifically, the worm is provided with a locking device controlled by means responsive to the displacement of the worm shaft, so as to lock the worm shaft against further hoisting movement when the load, through the thrust on the worm caused by it and correspondingly the axial displacement of the worm shaft exceed a certain predetermined amount.

For an illustration of the invention, I have shown on the accompanying drawings by way of example an embodiment of the invention.

Figure 1:
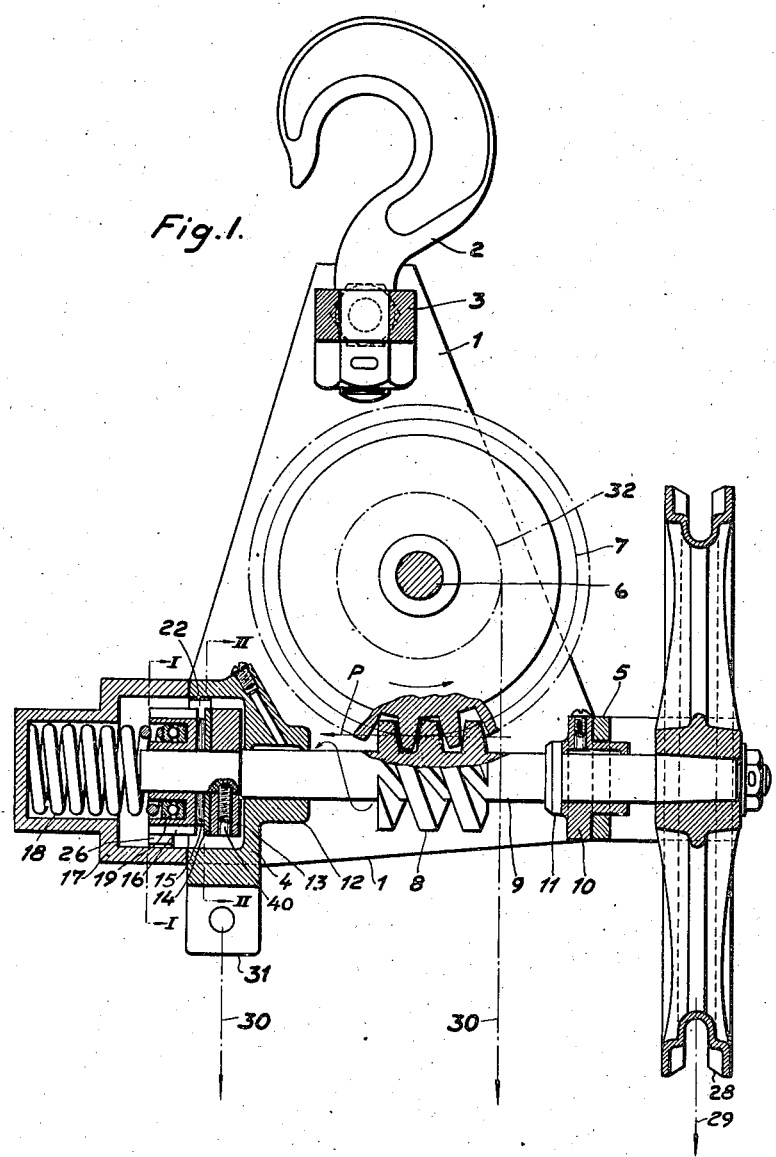
Fig. 1 is an elevational section of a load hoisting block of this invention.

The frame of the hoisting block consists of two frame plates 1, connected through a hook support 3 for the suspension hook 2 at its upper end and through bearing beam 5 and casing 4 at its lower end.

The worm gear comprises a worm wheel shaft 6, a worm wheel 7 mounted thereon, and a worm 8 on worm shaft 9. Worm wheel shaft 6 is mounted in the frame plates 1 and carries chain wheel 32 indicated by a dash-dotted circle, the hoisting chain being indicated by dash-dotted lines 30 its end secured to ears 31 which project from casing 4. In the loop formed by the two parts of the hoisting chain there runs in the conventional way a guide pulley with hook, not shown on the drawings.

Worm shaft 9 is rotatably mounted at its one end in bearing 10 carried by bearing beam 5 on the frame and at its other end by bearing 12 formed as part of the wall of casing 4. Hand chain wheel 28 is carried by worm shaft 9, the hand chain being indicated by dash-dotted line 29.

Worm shaft 9 further carries a collar 11 secured thereto which may abut against bearing 10 and thus limit the displacement of shaft 9 in one direction, in the position shown in Fig. 1, towards the right. The worm shaft is urged in this direction by a spring 18 coaxial with it. The spring 18 is housed in spring casing 17 secured to the frame and bears with its one end against the bottom of this casing. The other end of spring 18 is operatively connected with worm shaft 9 through mechanism which includes ball bearing 19, brake 16, 15, discs 14, 13, which I am about to describe. Worm shaft 9 is thus urged by spring 18 towards the right whereas the load, through chain 30, chain wheel 32, worm wheel shaft 6, and the pressure between the teeth of worm wheel 7 and the thread of worm 8, will exert a thrust in the axial direction and tend to displace worm shaft 9 towards the left against the action of spring 18, and in proportion to the magnitude of the load. If there is no load on chain 30 or only a small load, spring 18 will urge collar 11 against bearing 10.

The mechanism which transmits the thrusting force from the spring to the worm shaft includes a locking mechanism with means for actuating the locking mechanism responsive to the displacement of the worm shaft so that the shaft and the hoisting mechanism, the parts revolving as shown by the arrows on the worm wheel and the worm shaft respectively, may be locked against hoisting movements when the load and thus the thrust on, and the displacement of, the worm shaft, caused by the load, exceed a certain admissible predetermined amount.

The locking device comprises a ratchet, the wheel or disc 13 of which is rigidly connected to worm shaft 9 by means of clamp screw 40 and thus rotates with the shaft. The pawl 21 is pivoted at 20 in casing 4, and is urged towards ratchet 13 by means of spring 22. A disc 14 of diameter equal to the outer diameter of ratchet disc 13 is secured thereto and serves as a pawl lifting device responsive to the displacement of worm shaft 9. For this purpose, pawl 21 is so disposed in the axial direction relatively to ratchet disc 13 and pawl lifting disc 14 that when the axial displacement of worm shaft 9 is small, disc 14 is underneath pawl 21 and prevents it from falling into the ratchet.

Figure 5:
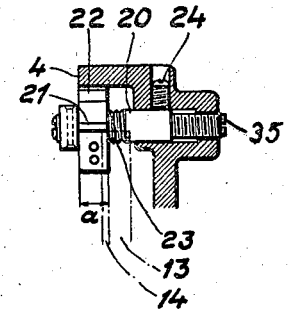
Fig. 5 is a section on line IV—IV of Fig. 3 showing the pawl mechanism of the locking ratchet.

However, when the axial displacement of the worm shaft against the action of spring 18 under the axial thrust of a certain maximum load reaches a certain length $a$ (see Fig. 5), disc 14 will move to the left sufficient for pawl 21 to drop into one of the notches of ratchet 13 under the action of pawl spring 22 and lock worm shaft 9 against hoisting movement.

The displacement of the worm shaft generally and that, specifically, at which pawl 21 will be released from the rim of disc 14 will depend on the characteristics of spring 18, i. e. its compression under the thrust of the load. Finer adjustments may be made by setting and displacing pivot 20 of pawl 21 in the axial direction, by means of screw 35 for instance, and may be fixed in the new position by set screw 24.

Figure 3:
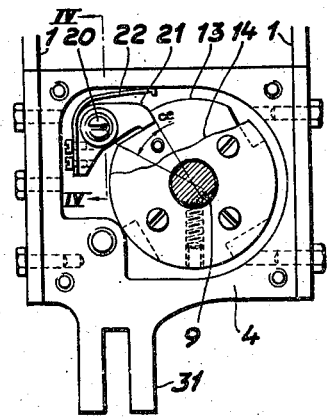
Fig. 3 is a section on line II—II of Fig. 1 showing a side view of the locking ratchet.
Figure 4:
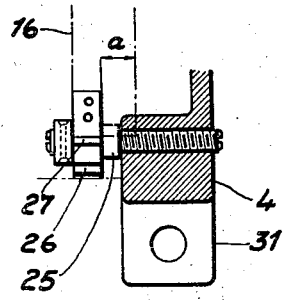
Fig. 4 is a section on line III—III of Fig. 2 illustrating the pawl mechanism of the brake ratchet.

When now the load is being lowered and worm shaft 9 rotated in the opposite sense, ratchet 13 will be released from engagement with pawl 21. Simultaneously since the thrust from the load decreases, spring 18 will expand and disc 14 will be shifted towards pawl 21. Pawl 21 is mounted on pivot 20 yieldable in an axial direction by means of spring 23 so that at the return of disc 14 towards pawl 21, this pawl may yield and be pushed towards the right should it be at this moment in a notch of ratchet 13. When on further rotation, about an angle $\alpha$, Fig. 3, pawl 21 arrives on the back of a ratchet tooth, it may be easily pushed by spring 23 towards the left and on the rim of disc 14. Ratchet disc 13 and worm shaft 9 may now revolve in either direction, pawl 21 being put out of action until at a hoisting movement the load will be excessive.

Between the free (right hand) end of spring 18 and disc 14 there is inserted a brake device 16, 15, which becomes effective when the load is to be lowered. The use of such a brake makes possible a large pitch of the worm gear so that the load may be lowered under its own weight and no selfbraking worm gear with its low efficiency is necessitated for the hoisting block of the invention.

A brake comprises a friction disc 15 and a ratchet with ratchet disc 16 and pawl 27. The arrangement constitutes a modification of the conventional hoisting brake adapted to the hoisting block of this invention.

Friction disc 15 and ratchet disc 16 are both loosely mounted on worm shaft 9. Ratchet disc 16 carries on its hub a ball thrust bearing 19 against which spring 18 bears. Pawl 27 is mounted on pivot 25 secured to casing 4 and is urged by means of pawl spring 26 against the ratchet teeth.

Figure 2:
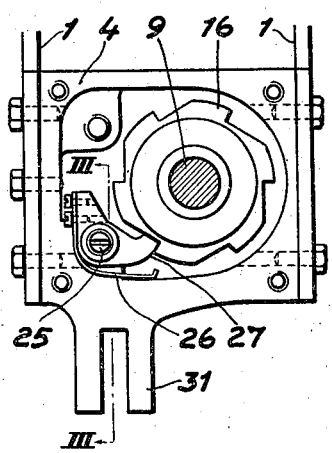
Fig. 2 is a section on line I—I of Fig. 1 showing a side view of a brake ratchet on the worm shaft.

When the load is being lowered, the worm shaft, as illustrated in Fig. 2, will rotate clockwise, and the ratchet or brake disc 16 will be stopped by pawl 27 as it drops into a notch of ratchet disc 16. Since disc 16 is under the axial pressure of spring 18, friction will be produced between friction disc 15 and discs 16 and 14, and the downward movement of the load will be braked.

Since disc 16 takes part in the axial movement or displacement of worm shaft 19, its rim is made correspondingly wider than the width of the stationary pawl 27 so that the pawl may not slide off from the rim of disc 16. By proper selection of the diameter of the friction disc the brake moment can be adjusted as ever desired.

During the hoisting operation, ever according to the weight of the load, spring 18 will be compressed more or less and will then fully expand again when the load is brought to rest on a firm support. As long as the load does not exceed the maximum capacity of the hoisting block, disc 14, ever according to the weight of the load and the axial thrust caused thereby, will slide to and fro under pawl 21. If, however, the predetermined capacity is exceeded, i. e., if the displacement of disc 14 under the axial thrust caused by the load exceeds the length $a$, pawl 21 will drop into a notch of ratchet disc 13 and further rotation of worm shaft 9 will be stopped in the manner described hereinbefore. Of course, the stopping of the worm shaft and thus of the hoisting block need not take place exactly at the maximum load, a suitable tolerance, say of about 100 kg., may be admitted.

The advantages obtained by my invention are in the field both of economy and security.

If the load is too high, the hoist chain, as a rule, will break first. The replacement of the broken chain is, of course, a trifle, but the interruption of the operation by such a mishap naturally is of considerably greater importance. Prevailing however is the question of security. The chain may break when the hoisting block carries a very heavy load, several tons for instance. Since at the hoisting operation, the person operating the block, as a rule, will be in immediate vicinity of the load, he thus will run the greatest risks when suddenly the load falls down.

These risks will be eliminated by the present invention and, consequently, the importance of the invention for the security of the workmen is obvious.

A further advantage of great importance is obtained through the invention. The conventional load hoisting blocks with screw gear are as a rule constructed in such a way that a single man alone cannot break the block. To some extent this serves as a safety device. For this purpose these hoisting blocks are provided with a hand chain wheel of small diameter. However, nothing prevents one or more persons from helping the operator and pulling with him the hand chain, and this will be the case rather often. Hence, the use of a hand chain wheel of small diameter is rather illusive as a safety device. Another disadvantage of a small hand chain wheel is of course that even for small loads unnecessarily great muscular strength must be used.

Contrariwise, in the hoisting blocks of the present invention, nothing limits the size of the hand chain wheel. Under any circumstances, when the load has reached its maximum, the worm shaft and thus the worm gear will be locked and remains locked irrespective of the number of persons pulling at the hand chain. Thus the safety amounts to 100%. The greater gear ratio which is now admissible facilitates to a great extent the hoisting work. With a conventional hoisting block, the required muscular effort is greater than that which a man is able to exert in continuous work. The result will be tiredness and slow work. If, however, the hoisting blocks are provided with the load limiting ratchet of this invention, the required manual power is held below normal capacity, and a rather considerable increase of the work may be obtained.

Having now described my invention, what I claim as new and desire to secure by Letters Patent is:

1. In a load hoisting block a worm gear comprising a worm wheel, a worm, a worm shaft mounted in said block and adapted for axial displacement under the thrust of the load operative through said worm gear on said worm shaft, said block and said worm shaft having each an abutment mounted thereon both adapted for cooperation and for limiting in one direction the axial displacement of said worm shaft; said worm shaft further having associated therewith a spring adapted for urging said worm shaft against the action of said thrust towards the abutment mounted on said block, a locking mechanism comprising a pawl and ratchet associated with said worm shaft and means for actuating said locking mechanism responsive to the displacement thereof whereby said worm shaft may be locked against hoisting movement when the displacement of said worm shaft under said thrust exceeds a predetermined amount.

2. A load hoisting block including in combination a frame, a worm wheel shaft mounted in said frame, a load chain wheel and a worm wheel seated upon and secured to said worm wheel shaft; a worm adapted to drive said worm wheel, a worm shaft, bearings disposed on said frame for carrying said worm shaft, a hand chain wheel seated on and secured to said worm shaft, said worm shaft adapted for axial displacement in said bearings, a collar mounted on and secured to said worm shaft and adapted to bear against one of said bearings for thus limiting in one direction the displacement of said worm shaft, a ratchet disc disposed on and secured to said worm shaft, a pawl mounted at said frame and adapted to cooperate with said ratchet disc; a pawl lifting device associated with said pawl and said worm shaft, a spring disposed coaxially with said worm shaft and mounted at said frame and bearing with its one end thereagainst; said spring further adapted with its other end to urge said worm shaft; whereby said worm shaft is capable of being urged in one direction by said spring towards the position where said collar abuts against said bearing and in the other direction by the thrust on said worm shaft exerted by the load through said worm wheel and said worm; said pawl lifting device comprising means responsive to the displacement of said worm shaft whereby to bring and hold said pawl out of engagement with said ratchet when the displacement of said worm shaft is below a certain predetermined amount and to bring said pawl into engagement with said ratchet and lock said worm shaft against hoisting movement when said displacement of said worm shaft reaches and exceeds said amount.

3. A load hoisting block as set forth in claim 2 wherein a ball bearing is disposed between said ratchet disc and the end of said spring urging it.

4. A load hoisting block as set forth in claim 2, said pawl lifting device comprising a pawl lifting disc disposed on one of the sides of said ratchet disc and covering same, said pawl being disposed with relation to said ratchet and said pawl lifting disc so as to be placed with the displacement of said worm shaft alternatively above said pawl lifting disc and above said ratchet.

5. A load hoisting block as set forth in claim 2, said pawl lifting device comprising a pawl lifting disc disposed on one of the sides of said ratchet disc and covering same, said pawl being disposed with relation to said ratchet and said pawl lifting disc so as to be placed with the displacement of said worm shaft alternatively above said pawl lifting disc and above said ratchet, said pawl being adjustably mounted in the axial direction on said frame.

PER EMIL PERMAN.